US005992369A

United States Patent [19]
Mehne

[11] Patent Number: 5,992,369
[45] Date of Patent: Nov. 30, 1999

[54] INTAKE DEVICE MADE FROM THERMOPLASTIC SYNTHETIC MATERIAL

[75] Inventor: Georg Mehne, Gschwend, Germany

[73] Assignee: Filterwerk Mann & Hummel GmbH, Ludwigsburg, Germany

[21] Appl. No.: 08/981,554

[22] PCT Filed: Apr. 16, 1996

[86] PCT No.: PCT/EP96/01581

§ 371 Date: May 1, 1998

§ 102(e) Date: May 1, 1998

[87] PCT Pub. No.: WO97/02422

PCT Pub. Date: Jan. 23, 1997

[30] Foreign Application Priority Data

Jun. 30, 1995 [DE] Germany ............... 195 23 870

[51] Int. Cl.$^6$ ............ F02M 35/104; F02M 35/112
[52] U.S. Cl. ................ 123/184.21; 123/184.61; 123/184.38
[58] Field of Search ............ 123/184.21, 184.38, 123/184.31, 184.61, 184.22, 184.23, 184.24, 184.25, 184.26, 184.27, 184.28, 184.29, 184.32, 184.33, 184.34, 184.35, 184.36, 184.37, 184.39, 184.41–184.59

[56] References Cited

U.S. PATENT DOCUMENTS 1,271,779   7/1918   Schroeder et al. .
4,301,775  11/1981   Smart et al. ................... 123/52 M
4,926,802   5/1990   Morris et al. .................. 123/52 M

FOREIGN PATENT DOCUMENTS

| 0 005 933 | 12/1979 | European Pat. Off. . | |
| 005933 A1 | 12/1979 | European Pat. Off. | 123/184.21 |
| WO 92/12845 | 8/1992 | European Pat. Off. . | |
| 2 494 343 | 5/1982 | France | 123/184.38 |
| 2034234 | 2/1972 | Germany | 123/184.47 |
| 3-92354 | 4/1991 | Japan | 123/184.55 |
| 5-106448 | 4/1993 | Japan | 123/184.21 |
| 2 191 818 | 12/1987 | United Kingdom | 123/184.57 |

*Primary Examiner*—Willis R. Wolfe
*Assistant Examiner*—Brian J. Hairston
*Attorney, Agent, or Firm*—Evenson, McKeown, Edwards & Lenahan, P.L.L.C.

[57] ABSTRACT

An intake device made from a thermoplastic synthetic resin material and intended specifically for use in an internal combustion engine. The intake device includes a first intake pipe or manifold composed of upper and lower half-shells which are joined to one another and have a common connecting flange. At least one other intake pipe or manifold composed of upper and lower half-shells is also provided and likewise also opens out through the common connecting flange.

5 Claims, 3 Drawing Sheets

INTAKE DEVICE MADE FROM THERMOPLASTIC SYNTHETIC MATERIAL

The invention relates to an intake device made of thermoplastic synthetic resin material, especially for the intake air of an internal combustion engine.

A press release from Bayer AG dated Nov. 3, 1993 indicates that a simple method for making intake stubs for automobiles comprises making half shells by the injection-molding process. Two of these molded parts at a time are extrusion-coated with plastic at the contact lines in such a fashion that an air-tight interlocking connection results. The advantage of this method is said to be that parts with smooth surfaces result. This process has been improved further in the meantime and can now be used with a plurality of intake manifolds and/or intake devices. In addition to extrusion-coating, the friction-welding process has also proven to be a successful technique for connecting the two half shells.

An intake manifold is known from EP 5933 B1, which likewise consists of two half shells. These shells are welded and/or glued to one another. One disadvantage of this half-shell technology is that very complex manifold geometries considerably complicate the connection of the half-shells. Especially in situations where manifolds intersect or are interlaced with one another, it is no longer possible to create a connection by extrusion-coating or friction-welding. In these cases, the core melt-out method has been used, but this involves a higher expense.

It is therefore the object of the invention to provide an intake device made of thermoplastic synthetic resin material in which manufacturing can be performed by the half-shell technique despite the use of complex shapes. This object is achieved by the invention as described hereinafter.

The main advantage of the invention is that the intake device is composed of two intake manifolds, with both intake manifolds being produced by the half-shell technique and the second intake manifold can be connected with the first intake manifold in the flange area.

In one embodiment of the invention, both intake manifolds terminate in a common collecting chamber, especially in the air-collecting chamber located downstream from an air filter.

In a preferred improvement, the two half-shells are connected together using plastic welding technology. Friction welding technology as well as ultrasonic welding technology have proven successful in this regard. Of course it is also possible to join the half-shells to one another by means of the extrusion-coating process, and also by using suitable gluing or fitting techniques.

In another embodiment of the invention, the intake manifolds are provided in the vicinity of the connecting flange with a common opening that joins the intake manifolds. A resonance switching valve is fitted into this opening, said valve connecting the two intake manifolds in terms of flow above a certain engine rpm to provide increased engine power in the upper rpm range. This connection can also be designed to serve as a mounting location for the two engine intake manifolds, thus increasing stability.

In another embodiment of the invention, the second intake manifold is provided with a plug-in connection in the connecting area. This assures an especially simple and reliable connection that requires a low manufacturing cost.

Inasmuch as the first intake manifold is connected with the connecting flange, the flange is suitable as the support for the second intake manifold because of its higher stability. Of course, it is also possible to provide the second intake manifold with supporting functions that make it possible to couple the first intake manifold to the second intake manifold.

These and other features of preferred embodiments of the invention follow from the specification and the drawings as well as from the claims, with the individual features being implemented either individually or severally in the form of subcombinations in the embodiments of the invention and being usable in other areas and representing advantageous embodiments that can themselves be protected, for which protection is hereby claimed.

The invention will be described in greater detail hereinafter with reference to a working embodiment.

Figure 1:
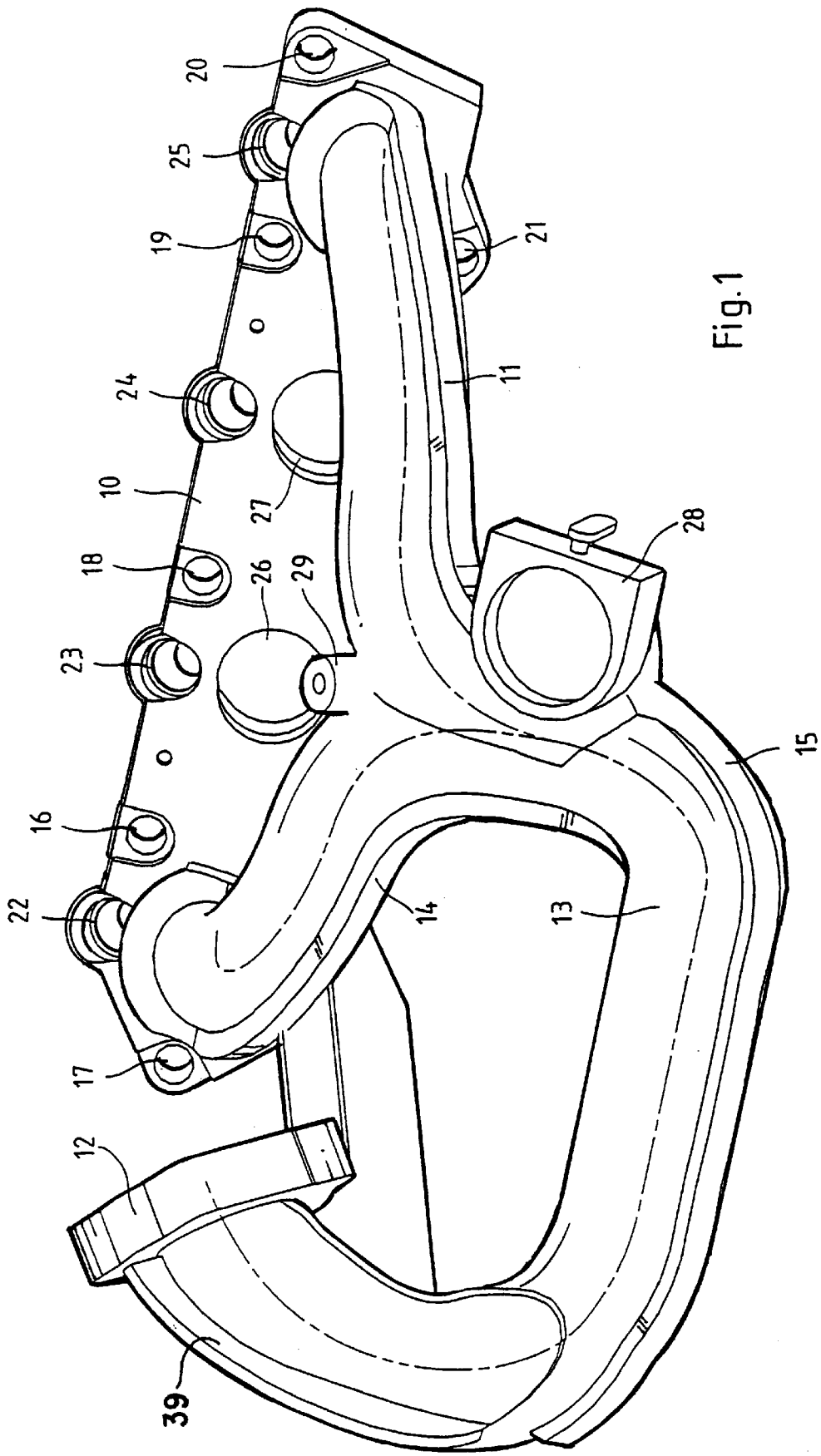
FIG. 1 shows a perspective view of the first intake manifold.

The intake device shown in FIG. 1 comprises a connecting flange 10 connected with a lower half-shell 11 of an intake manifold. Connecting flange 10 and lower half-shell 11 constitute a single injection-molded part. Flange 12 is also mounted on this injection-molded part. Upper half-shell 13 is fastened by vibration welding to lower half-shell 11. The connection is made along contact surfaces 14 and 15. Connecting flange 10 has mounting holes 16, 17, 18, 19, 20, 21 as well as holes for injectors 22, 23, 24, 25, and two holes 26, 27 for mounting a second intake manifold.

An insert 28 for a switching valve is also provided on lower half-shell 11 of the intake manifold, together with a supporting element 29.

Figure 2:
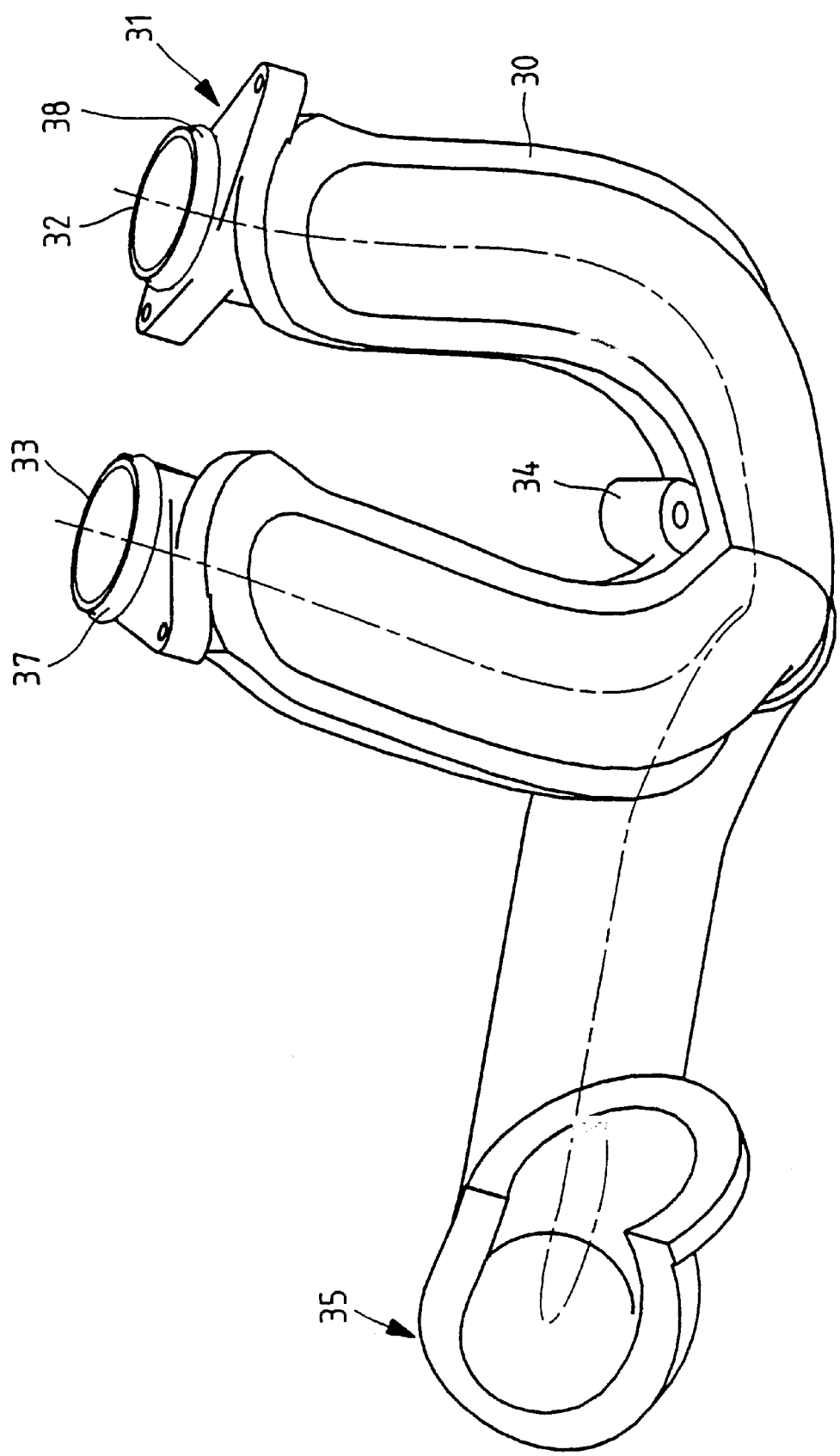
FIG. 2 shows a perspective view of a second intake manifold.

FIG. 2 shows a second intake manifold that complements first intake manifold shown in FIG. 1. This second intake manifold is likewise assembled using the two-shell technique and comprises a lower half-shell 30 and an upper half-shell 31, the upper half-shell being provided with two connecting flange parts 32 and 33. O-rings 37, 38 are located on the connecting flange parts. During assembly, these connecting flange parts are introduced into openings 26 and 27 according to FIG. 1.

The second intake manifold is then fastened to supporting element 29 of first intake manifold by means of eye 34 as well as a connection between flange 35 and flange 39 produced in the vicinity of flange 12.

Figure 3:
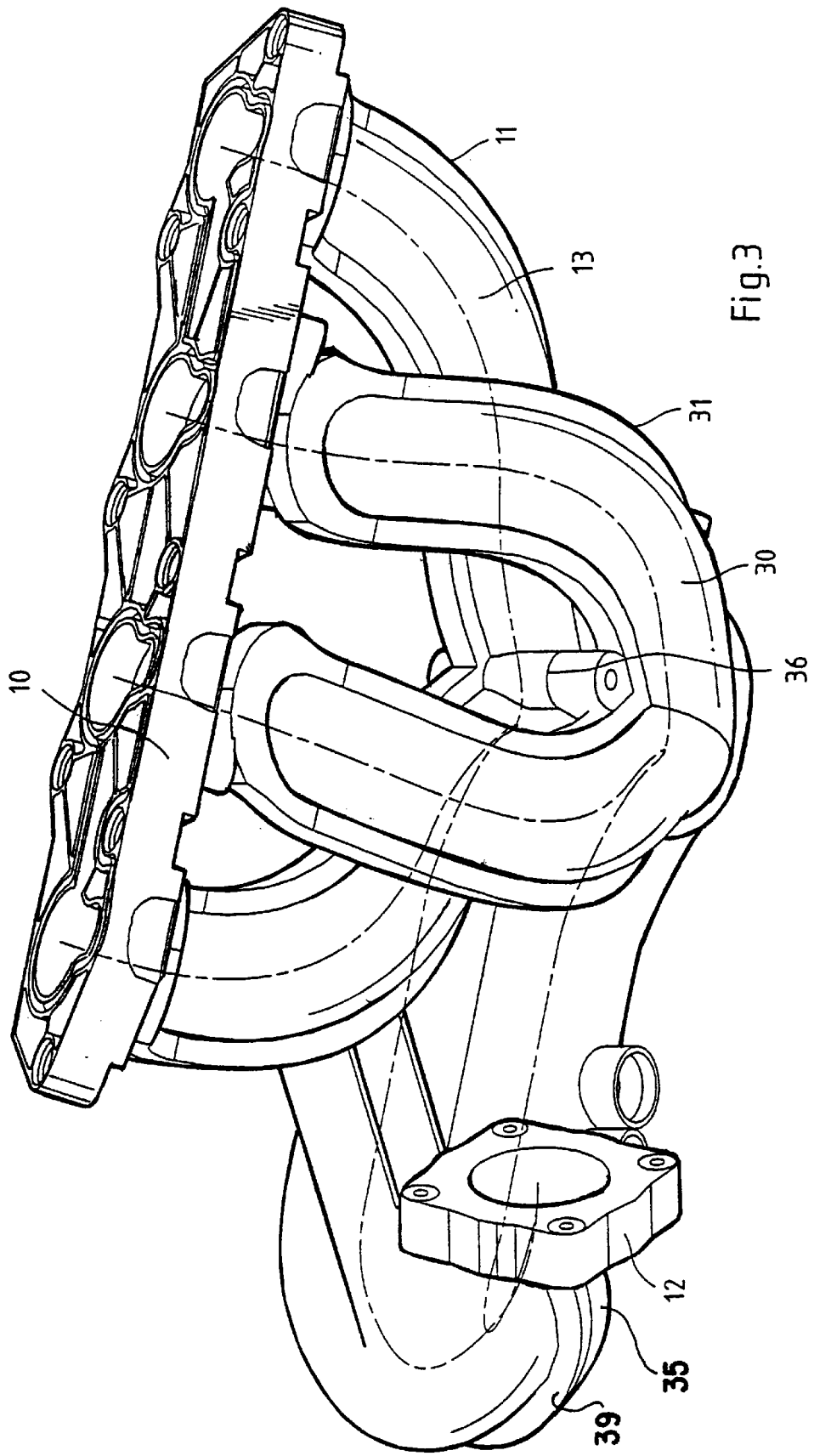
FIG. 3 shows the combination of the two intake manifolds.

FIG. 3 shows a completely assembled intake device with four half-shells 11 and 13 and 30 and 31. Because of the plug-in connection of the second intake manifold at connecting flange 10 as well as the connection in area 36 between supporting element 29 and eye 34 and the fastening of the second intake manifold via flange 35 to the flange area 39 adjacent flange 12, a very rigid coupling is provided for the two intake manifolds. Of course, it is possible to couple a plurality of intake manifolds together. It is also possible to use this system in a V-engine.

| Reference Number List | |
|---|---|
| 10 | connecting flange |
| 11 | lower half-shell |
| 12 | flange |
| 13 | upper half-shell |
| 14 | contact surface |
| 15 | contact surface |
| 16 | mounting hole |
| 17 | mounting hole |
| 18 | mounting hole |
| 19 | mounting hole |
| 20 | mounting hole |
| 21 | mounting hole |
| 22 | hole |

-continued

| Reference Number List | |
|---|---|
| 23 | hole |
| 24 | hole |
| 25 | hole |
| 26 | hole |
| 27 | hole |
| 28 | insert |
| 29 | supporting element |
| 30 | lower half-shell |
| 31 | upper half-shell |
| 32 | flange part |
| 33 | flange part |
| 34 | eye |
| 35 | flange connection |
| 36 | area |
| 37 | O-ring |
| 38 | O-ring |

I claim:

1. An air intake device for intake air of an internal combustion engine, said device being made of thermoplastic synthetic resin material and being comprised of a first manifold comprising a first upper half-shell and a first lower half-shell which are connected with one another and terminate at a common mounting flange, and a second manifold comprising a second upper half-shell and a second lower half-shell which likewise are connected to each other, said second manifold also opening out through said common mounting flange; wherein said second manifold is attached to a support element on the first manifold and is also connected via a flange connection to said first manifold adjacent a connecting flange arranged at an end of said first manifold remote from said common mounting flange.

2. An intake device according to claim 1, wherein each upper half-shell is connected to the respective lower half-shell by plastic welding.

3. An intake device according to claim 1, wherein said first and second manifolds have a connecting opening, and a resonance switching valve is provided in said connecting opening.

4. An intake device according to claim 1, wherein the second intake manifold is fastened to said common mounting flange with a plug-in connection.

5. An intake device according to claim 1, wherein the second intake manifold is supported by said first intake manifold.

* * * * *